United States Patent [19]

Yano et al.

[11] 4,083,099
[45] Apr. 11, 1978

[54] MANUFACTURE OF A TWISTED NEMATIC FIELD EFFECT MODE LIQUID CRYSTAL DISPLAY CELL

[75] Inventors: Kozo Yano, Tenri; Hiroshi Kuwagaki, Kyoto; Sadatoshi Takechi, Nara, all of Japan

[73] Assignee: Sharp Kabushiki Kaisha, Japan

[21] Appl. No.: 672,505

[22] Filed: Mar. 31, 1976

[30] Foreign Application Priority Data

Mar. 31, 1975 Japan .................... 50-39471

[51] Int. Cl.² .......................... H01S 4/00; G02F 1/13
[52] U.S. Cl. ................................. 29/592 R; 350/334; 427/42; 428/1
[58] Field of Search .................. 29/592, 576 R, 588; 350/160 LC, 150, 160 R; 428/1; 427/42, 109; 240/2.25; 23/230 LC; 156/145

[56] References Cited

U.S. PATENT DOCUMENTS

| | | | |
|---|---|---|---|
| 3,276,902 | 10/1966 | Abraham | 427/42 |
| 3,347,701 | 10/1967 | Yamagishi et al. | 427/42 X |
| 3,625,591 | 12/1971 | Freiser et al. | 350/160 LC X |
| 3,655,428 | 4/1972 | Bragard | 427/42 |
| 3,799,651 | 3/1974 | Janning | 350/160 LC |
| 3,834,792 | 9/1974 | Janning | 29/592 X |
| 3,885,860 | 5/1975 | Sorkin | 29/592 X |
| 3,926,502 | 12/1975 | Tanaka et al. | 428/1 X |
| 3,932,026 | 1/1976 | Sprokel | 350/160 LC |

FOREIGN PATENT DOCUMENTS 2,418,022  10/1974  Germany ............ 350/160 LC

*Primary Examiner*—Victor A. DiPalma
*Attorney, Agent, or Firm*—Birch, Stewart, Kolasch & Birch

[57] ABSTRACT

A transparent insulating film having a low adsorption characteristic of organic elements such as silicon dioxide is formed on a glass substrate carrying transparent electrodes formed thereon. The surface of the transparent insulating film is rubbed to form micro-grooves aligned in a predetermined direction. Two glass substrates having internal surfaces carrying micro-grooves formed in the above-mentioned manner are spaced against and adhered to each other and sealed through the use of a glass frit or glass paste, between which liquid crystal compositions are filled.

4 Claims, 1 Drawing Figure

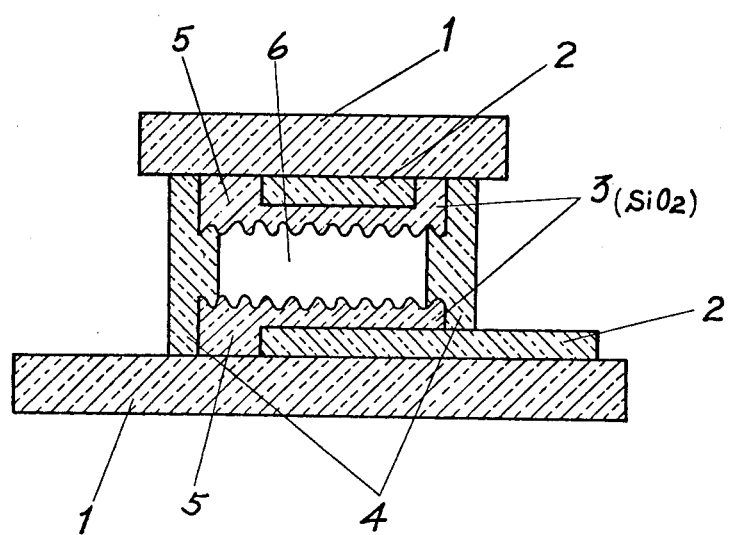

MANUFACTURE OF A TWISTED NEMATIC FIELD EFFECT MODE LIQUID CRYSTAL DISPLAY CELL

BACKGROUND AND SUMMARY OF THE INVENTION

The present invention relates to the manufacture of a twisted nematic field effect mode liquid crystal display cell.

Heretofore, a twisted nematic field effect mode liquid crystal display cell was generally manufactured by one of the following two methods:

(1). A transparent insulating film was formed, through the use of evaporation techniques, on a glass substrate with transparent electrodes formed thereon in order to uniform the hardness of the surface of the glass substrate and protect the transparent electrodes from the surrounding environment. Then the surface of the transparent insulating film was rubbed with the use of a polishing cloth to form micro-grooves aligned in a predetermined direction. The thus formed two glass substrates were spaced from each other by a distance of about ten micrometers (10 $\mu$m) in such a manner that the alignment directions on the respective glass substrates were orthogonal to each other and sealed through the use of epoxy resin. The space between the substrates was then filled with liquid crystal compositions.

(2). A transparent insulating film was formed, through the use of evaporation techniques, on a glass substrate with transparent electrodes formed thereon in order to uniform the hardness of the surface of the glass substrate and protect the transparent electrodes from the surrounding environment. Then micro-grooves aligned in a predetermined direction were formed through the use of silicon oxide tilted evaporation techniques. The thus formed two glass substrates were then spaced from each other by a distance of around ten micrometers (10 $\mu$m) in such a manner that the alignment directions on the respective glass substrates were orthogonal to each other and sealed through the use of low melting sealing glass. Liquid crystal compositions were then filled in the spaces between the substrates.

A hermetic seal using the low melting sealing glass is superior to a sealing method using epoxy resin, because the hermetic seal can prevent moisture invasion. Moisture will increase the conductivity of liquid crystal composition and will promote chemical deterioration of a liquid crystal composition.

The rubbing ethod discussed hereinbefore is superior to the silicon oxide tilted evaporation technique because silicon oxide tilted evaporation is not suited for mass production since it is difficult to use an evaporation source of a large size.

However, in the mechanical rubbing method a glass paste used with the low melting sealing glass will generate organic elements during the heat seal operation, the organic elements damaging the alignment formed on the transparent insulating film by attaching to its surface when the alignment is effected. Therefore, in the prior art, the alignment was effected through the use of silicon oxide tilted evaporation techniques when low melting sealing glass was used for sealing the twisted nematic field effect mode liquid crystal display cell.

Accordingly, an object of the present invention is to provide a method of manufacturing a twisted nematic field effect mode liquid crystal display cell suited for mass production.

Another object of the present invention is to combine a hermetic seal with the mechanical rubbing method in fabricating twisted nematic field effect mode liquid crystal display cells.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objectives, pursuant to an embodiment of the present invention, a transparent insulating film having a low adsorption characteristic of organic elements such as silicon dioxide is formed on a glass substrate with transparent electrodes formed thereon. The surface of the transparent insulating film made of silicon dioxide is mechanically rubbed through the use of a polishing cloth or felt in order to form micro-grooves aligned in a predetermined direction. The organic elements generated from the glass paste during the low melting glass sealing operation will scarcely adhere to the surface of the transparent insulating film made of silicon dioxide and, therefore, the alignment will not be damaged.

BRIEF DESCRIPTION OF THE DRAWING

The present invention will become more fully understood from the detailed description given hereinbelow and the accompanying drawing which is given by way of illustration only, and thus is not limitative of the present invention and wherein, the single drawing is a sectional view showing a twisted nematic field effect mode liquid crystal display cell manufactured by the method of the present invention.

DESCRIPTION OF THE PREFERRED EMBODIMENTS

Transparent electrodes 2 are formed on a glass substrate 1 through the use of the conventional method such as the Tin Indium Coating Method. A transparent insulating film 3 made of silicon dioxide is formed on the glass substrate 1 carrying the transparent electrodes 2 formed thereon through the use of electron beam evaporation techniques under a gas pressure of around $5 \times 10^{-4}$ torr. The surface of the transparent insulating film 3 made of silicon dioxide is mechanically rubbed by a polishing cloth to form micro-grooves aligned in a predetermined direction.

A glass frit 4 having a low melting point is deposited on the glass substrates 1 in such a manner to surround the transparent insulating films 3 made of silicon dioxide. The formation of glass frit 4 is achieved through the use of a conventional screen printing method. The low melting glass frit 4 is preferably a glass frit designated Y.103 and fabricated by Du Pont. The two glass substrates 1 are spaced from each other by a distance of about ten mierometers (10 $\mu$m) in such a manner that the alignment directions on the respective insulating films 3 of the glass substrates 1 are orthogonal to each other as is well known in the art. The thus formed package is maintained at 550° C for 30 minutes to heat seal the liquid crystal display cell.

Schiff-base mixed liquid crystal compositions 6 such as

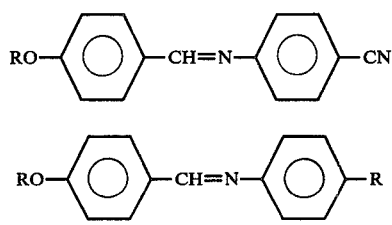

where R is an alkyl group such as $CH_3$, $C_2H_5$ and $C_4H_9$ are filled between the two glass substrates 1. The liquid crystal compositions 6 show a desired twisted nematic phase and the twisted nematic phase is maintained for a sufficient long period.

The following Table I shows various conditions of the formation of the transparent insulating film 3.

TABLE I (FORMATION OF THE TRANSPARENT INSULATING FILM MADE OF SILICON DIOXIDE THROUGH THE USE OF ELECTRON BEAM EVAPORATION)

| Thickness of the film (A) | Evaporation Velocity (A/sec) | Substrate Temperature (° C) | Gass Pressure (Torr) | Resistance Between Electrodes(Ω) | Alignment |
|---|---|---|---|---|---|
| 1000 | ≃3 | 300 | $5 \times 10^{-5}$ | ≃$10^9$ | X |
| 1000 | ≃3 | 300 | $1 \times 10^{-4}(O_2)$ | ≃$10^9$ | X |
| 1000 | ≃3 | 300 | $3 \times 10^{-4}(O_2)$ | | X |
| 1000 | ≃3 | 300 | $5 \times 10^{-4}(O_2)$ | | X |
| 1000 | ≃3 | 150 | $1 \times 10^{-4}(O_2)$ | | X |
| 1000 | ≃3 | 150 | $3 \times 10^{-4}(O_2)$ | | |
| 1000 | ≃3 | 150 | $5 \times 10^{-4}(O_2)$ | ≃$10^9$ | |
| 1000 | ≃3 | 150 | $7 \times 10^{-4}(O_2)$ | | |
| 1000 | ≃3 | Room Temperature | $1 \times 10^{-4}(O_2)$ | | X |
| 1000 | ≃3 | Room Temperature | $3 \times 10^{-4}(O_2)$ | | |
| 1000 | ≃3 | Room Temperature | $5 \times 10^{-4}(O_2)$ | | |

The twisted nematic field effect mode liquid crystal display cell is tested under the following conditions:

| | |
|---|---|
| Liquid Crystal Composition | : GR-4 (750129 Lot) by Chisso Co. |
| Glass Frit | : EMCA GLASS 101 |
| Thickness of the Liquid Crystal Composition | : 9 μm |
| Glass Substrate | : B. L. C. |

The electric current flowing through the liquid crystal composition does not change after maintaining the liquid crystal display cell in a dark room at room temperature for 60 hours.

The electric current flowing through the liquid crystal composition also does not change after maintaining the liquid crystal display cell in a dark room at a temperature of 40° C for 60 hours. The electric current flowing through the liquid crystal composition increases by 20 percent after exposing the liquid crystal display cell to ultraviolet radiation for 10 munutes.

The result of the CYCLE TEST MIL-202 for 15 cycles is as follows:

(1) Alignment and the seal are not damaged.

(2) Electric current increases to 1.05 times in the mean value.

(3) Threshold voltage (32 Hz sinusoidal waveform) is maintained at 1.5 ± 0.1 Vrms.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method for fabricating a twisted nematic field effect mode liquid crystal display cell comprising the steps of:

a. providing two glass substrates each having a major surface thereon;
   b. forming electrode patterns on the major surfaces of the respective glass substrates;
   c. coating each of the major surfaces of the glass substrate with a transparent insulator film made of silicone dioxide which resists absorption of organic elements therein;
   d. rubbing the surface of each of the transparent insulating films to form micro-grooves aligned in a predetermined direction;
   e. depositing glass frit on at least one of said glass substrates in surrounding relationship to said insulating film thereon;
   f. securing the other glass substrate to said glass frit in spaced relationship to said at least one glass substrate by means of a glass paste and the application of heat, said glass paste being of a composition which emits organic elements when said heat is applied thereto; and
   g. filling a liquid crystal composition between said two glass substrates.

2. The method of claim 1, wherein said transparent insulating film is applied by electron beam evaporation techniques.

3. The method of claim 1, wherein the electron beam evaporation is carried out under a pressure of around 5 $\times 10^{-4}$ torr.

4. The method of claim 1, wherein the glass frit is deposited through the use of the screen printing method.